(12) United States Patent
Wang et al.

(10) Patent No.: US 12,417,345 B2
(45) Date of Patent: Sep. 16, 2025

(54) METHOD AND APPARATUS FOR CONSTRUCTING OBJECT RELATIONSHIP NETWORK, AND ELECTRONIC DEVICE

(71) Applicant: BEIJING BAIDU NETCOM SCIENCE TECHNOLOGY CO., LTD., Beijing (CN)

(72) Inventors: Peng Wang, Beijing (CN); Hengshu Zhu, Beijing (CN); Zheng Dong, Beijing (CN); Kaichun Yao, Beijing (CN); Chuan Qin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 439 days.

(21) Appl. No.: 17/939,271

(22) Filed: Sep. 7, 2022

(65) Prior Publication Data
US 2023/0004715 A1    Jan. 5, 2023

(30) Foreign Application Priority Data

Jan. 17, 2022  (CN) .......................... 202210051806.8

(51) Int. Cl.
*G06F 40/279*      (2020.01)
*G06F 16/334*      (2025.01)
*G06F 40/253*      (2020.01)

(52) U.S. Cl.
CPC ........ *G06F 40/279* (2020.01); *G06F 16/3347* (2019.01); *G06F 40/253* (2020.01)

(58) Field of Classification Search
CPC .. G06F 40/279; G06F 16/3347; G06F 40/253; G06F 16/355; G06F 40/216;
(Continued)

(56) References Cited

U.S. PATENT DOCUMENTS

| | | | |
|---|---|---|---|
| 8,510,099 B2 * | 8/2013 | Dai ...................... | G06F 40/205 715/264 |
| 8,650,196 B1 * | 2/2014 | Zhou ..................... | G06F 16/35 707/737 |

(Continued)

FOREIGN PATENT DOCUMENTS

| | | |
|---|---|---|
| CN | 101223525 B | 4/2012 |
| CN | 103092828 A | 5/2013 |

(Continued)

OTHER PUBLICATIONS

CN-111400448-A MT translation (Year: 2020).*
(Continued)

*Primary Examiner* — Bhavesh M Mehta
*Assistant Examiner* — Darioush Agahi
(74) *Attorney, Agent, or Firm* — Tucker Ellis LLP

(57) ABSTRACT

A method and an apparatus for constructing an object relationship network and an electronic device are provided by the present disclosure, relating to the field of artificial intelligence technologies, such as deep neural networks, deep learning, etc. A specific implementation solution is: extracting keywords in respective text contents corresponding to a plurality of objects to obtain keywords corresponding to respective objects; and according to the keywords corresponding to the objects, a similarity between the plurality of objects is determined; and then according to the similarity between the plurality of objects, an object relationship network between the plurality of objects is constructed. Since the object relationship network constructed by means of the similarity between the plurality of objects can accurately describe a closeness degree of a relationship between the objects, thus, the plurality of objects can be managed effectively by means of the constructed object relationship network.

11 Claims, 6 Drawing Sheets

(58) Field of Classification Search
CPC ...... G06F 40/268; G06F 40/30; G06F 40/284; G06F 16/35; G06F 40/242; G06F 40/289
See application file for complete search history.

(56) References Cited

U.S. PATENT DOCUMENTS

| | | | |
|---|---|---|---|
| 2010/0293166 A1* | 11/2010 | Hatami-Hanza | G06F 16/278 |
| | | | 707/769 |
| 2012/0054206 A1* | 3/2012 | Franks | G06F 16/3347 |
| | | | 707/750 |
| 2012/0246171 A1 | 9/2012 | Teerlink | |
| 2014/0122464 A1* | 5/2014 | Arunachalam | G06F 16/9538 |
| | | | 707/723 |
| 2019/0205769 A1* | 7/2019 | Xie | G06Q 30/0613 |
| 2019/0220752 A1* | 7/2019 | Xu | G06F 16/28 |
| 2020/0074322 A1* | 3/2020 | Chungapalli | G06F 18/29 |
| 2020/0193160 A1 | 6/2020 | Lee et al. | |
| 2020/0380211 A1* | 12/2020 | Fan | G06N 3/08 |
| 2021/0064657 A1 | 3/2021 | Gopalan et al. | |
| 2021/0081832 A1* | 3/2021 | Ji | G06F 18/2411 |
| 2023/0067628 A1* | 3/2023 | Carter | G06F 16/489 |
| 2023/0070715 A1* | 3/2023 | Pajak | G06N 3/09 |
| 2023/0162021 A1* | 5/2023 | Chorakhalikar | G06N 3/045 |
| | | | 706/15 |
| 2023/0232075 A1* | 7/2023 | Min | G06F 16/48 |
| | | | 725/34 |
| 2024/0037003 A1* | 2/2024 | Barcelos | G06N 3/045 |

FOREIGN PATENT DOCUMENTS

| | | | | |
|---|---|---|---|---|
| CN | 104933164 A | | 9/2015 | |
| CN | 110866095 A | | 3/2020 | |
| CN | 111311409 A | | 6/2020 | |
| CN | 111400448 A | * | 7/2020 | |
| CN | 111737989 A | * | 10/2020 | G06F 16/3329 |
| CN | 112804210 A | | 5/2021 | |
| JP | 2007-133516 A | | 5/2007 | |
| KR | 101829001 B1 | | 2/2018 | |

OTHER PUBLICATIONS

CN-111737989-A MT translation (Year: 2020).*
Office Action of corresponding Chinese Application No. 202210051806.8, dated Sep. 26, 2023, 11 pages.
Notification of Grant of Patent Right for Invention of corresponding Chinese Application No. 202210051806.8, dated Apr. 22, 2024, 6 pages.
Lihui et al., "Research on Network Public Opinion Key Nodes Identification and Classification Model Based on SNA and Fuzzy TOPSIS", Journal of Modern Information, Aug. 15, 2017, vol. 37, No. 8, 9 pages.

* cited by examiner

METHOD AND APPARATUS FOR CONSTRUCTING OBJECT RELATIONSHIP NETWORK, AND ELECTRONIC DEVICE

CROSS-REFERENCE TO RELATED APPLICATIONS

The present application claims priority to Chinese Patent Application No. 202210051806.8, filed on Jan. 17, 2022, which is hereby incorporated by reference in its entirety.

TECHNICAL FIELD

The present disclosure relates to the field of data processing technologies, and in particular, to the field of artificial intelligence technologies, such as deep neural networks, deep learning and the like, and specifically, to a method and an apparatus for constructing an object relationship network, and an electronic device.

BACKGROUND

When management is performed on a plurality of objects, taking a plurality of management policies and regulations, such as, recruiting regulations, regulations of people management, cadre management, organization management, in an enterprise as an example, association relationships, such as, a mutual reference relationship, an upstream and downstream dependency relationship, generally exist among the regulations.

In view of the existence of the association relationships among the regulations, if a certain regulation is adjusted, for example, the regulation is changed, a linkage change may be caused to other regulations which have an association relationship with the regulation. Therefore, how to effectively manage the plurality of objects is a problem to be solved urgently by those skilled in the present disclosure.

SUMMARY

According to a first aspect of the present disclosure, a method for constructing an object relationship network is provided, and the method for constructing the object relationship network may include:

extracting keywords in respective text contents corresponding to a plurality of objects to obtain keywords corresponding to respective objects;

determining a similarity between the plurality of objects according to the keywords corresponding to the objects; and constructing an object relationship network between the plurality of objects according to the similarity between the plurality of objects.

According to a second aspect of the present disclosure, a method for training a classification model is provided, and the method for training the classification model may include:

acquiring a plurality of sample word segmentation combinations, where each of the sample word segmentation combinations corresponds to a label, and the label is used for indicating whether a sample word segmentation combination is a keyword;

inputting sample vector representations corresponding to the plurality of sample word segmentation combinations into an initial classification model, to obtain prediction results corresponding to respective ones of the sample word segmentation combinations; where a prediction result is used for indicating whether a sample word segmentation combination is predicted to be a keyword; and updating a network parameter of the initial classification model according to the prediction results and labels corresponding to the sample word segmentation combinations.

According to a third aspect of the present disclosure, an apparatus for constructing an object relationship network is provided, and the apparatus for constructing the object relationship network may include:

at least one processor; and a memory communicatively coupled to the at least one processor, wherein the memory stores instructions which are executable by the at least one processor, the instructions are executed by the at least one processor, to enable the at least one processor to:

extract keywords in respective text contents corresponding to a plurality of objects to obtain keywords corresponding to respective objects;

determine a similarity between the plurality of objects according to the keywords corresponding to the objects; and construct an object relationship network between the plurality of objects according to the similarity between the plurality of objects.

According to a fourth aspect of the present disclosure, an electronic device is provided, and the electronic device may include:

at least one processor; and a memory communicatively coupled to the at least one processor;

where the memory stores instructions which are executable by the at least one processor, where the instructions are executed by the at least one processor, to enable the at least one processor to execute the method for training a classification model according to the second aspect.

According to a fifth aspect of the present disclosure, a non-transitory computer-readable storage medium storing computer instructions is provided, where the computer instructions are used for causing a computer to execute the method for constructing an object relationship network according to the first aspect, or the method for training a classification model according to the second aspect.

It should be understood that, the contents described in this section are not intended to identify key or critical features of embodiments of the present disclosure, nor to limit the scope of the present disclosure. Other features of the present disclosure will become readily apparent from the following description.

BRIEF DESCRIPTION OF DRAWINGS

The accompanying drawings are used for better understanding of the present solution, and are not intended to limit the present disclosure, where.

DESCRIPTION OF EMBODIMENTS

Figure 1:
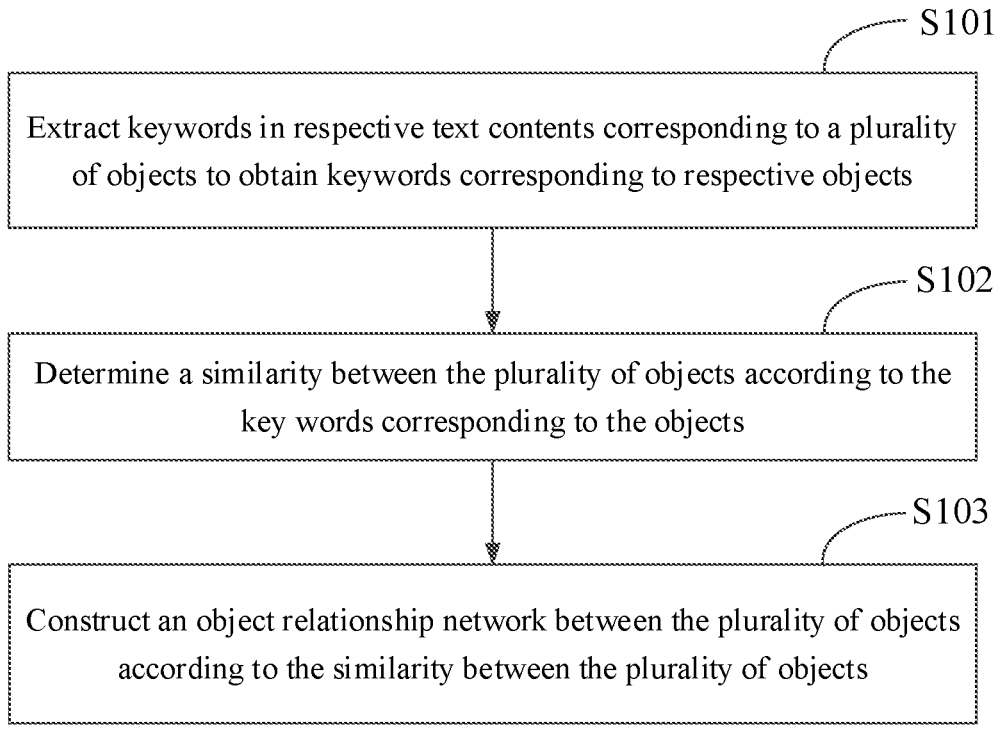
FIG. 1 is a schematic flowchart of a method for constructing an object relationship according to a first embodiment of the present disclosure.

Illustrative embodiments of the present disclosure will be described below with reference to accompanying drawings, where various details of embodiments of the present disclosure are included to facilitate understanding, which should be considered as merely illustrative. Accordingly, a person of ordinary skill in the art should recognize that various changes and modifications of the embodiments described herein may be made without departing from the scope and spirit of the present disclosure. Also, descriptions of well-known functions and structures are omitted in the following description for clarity and conciseness.

In the embodiments of the present disclosure, "at least one" means one or more, "a plurality of" means two or more than two. "And/or", which describes an association relationship of associated objects, represents that there may exist three relationships. For example, A and/or B, which may represent three cases: A exists alone, A and B exist at the same time, and B exists alone, where A and B may be singular or plural. In textual description of the present disclosure, the character "/" generally indicates that the associated objects before and after are of an "or" relationship. In addition, in the embodiments of the present disclosure, "first", "second", "third", "fourth", "fifth" and "sixth" are only used for distinguishing contents of different objects, and do not have other special meanings.

Technical solutions provided by the embodiments of the present disclosure can be applied to the field of artificial intelligence technologies, such as deep neural networks, deep learning. Taking a scenario of regulation management in an enterprise as an example, generally, there exists a plurality of management regulations in the enterprise. Generally, there exists an association relationship between the regulations, for example, a mutual reference relationship and an upstream and downstream dependency relationship. If a certain regulation is adjusted, for example, the regulation is changed, a linkage change may be caused to other regulations which have an association relationship with the regulation.

Currently, when management is performed on a plurality of regulations, the plurality of regulations are generally managed manually. However, when the manner of manual management is adopted, not only labor cost is expensive, but also it is difficult to quantify a closeness degree of a relationship between the regulations since whether there exists a relationship between the regulations is determined based on experience without support of an accurate mathematical model, thereby causing great difficulty and low efficiency in the management. Therefore, how to effectively manage the plurality of regulations is an urgent problem to be solved by a person skilled in the art in the present disclosure.

In order to effectively manage the plurality of regulations, considering that the relationship between the regulations is mainly reflected by text contents corresponding to the regulations, hence, keywords in respective text contents corresponding to the plurality of regulations may be extracted to obtain keywords corresponding to respective regulations; a similarity between the plurality of regulations may be determined according to the keywords corresponding to the regulations; and then an object relationship network between the plurality of regulations may be constructed according to the similarity between the plurality of regulations. In view that the object relationship network which is constructed by means of the similarity between the plurality of regulations can accurately describe the closeness degree of the relationship between the regulations, therefore, the plurality of regulations can effectively be managed by means of the constructed object relationship network.

Based on the above technical concept, embodiments of the present disclosure provide a method for constructing an object relationship network. The method for constructing the object relationship network provided in the present disclosure will be described in detail through specific embodiments. It should be understood that the following specific embodiments may be combined with each other, and the same or similar concept or process may not be repeated in some embodiments.

First Embodiment

FIG. 1 is a schematic flowchart of a method for constructing an object relationship network according to a first embodiment of the present disclosure. The method for constructing the object relationship network may be executed by software and/or a hardware apparatus. For example, the hardware apparatus may be a terminal or a server. Illustratively, with reference to FIG. 1, the method for constructing the object relationship network may include the following.

S101: Extract keywords in respective text contents corresponding to a plurality of objects to obtain keywords corresponding to respective objects.

Taking an example where the objects are regulations in an enterprise, illustratively, when acquiring respective text contents corresponding to a plurality of regulations, considering that formats of different regulation documents are various, for example, a picture format, a portable document format (PDF), a PPT format, a Word format, and the like, thus different acquiring methods may be used to acquire the respective text contents corresponding to the plurality of regulations.

For a regulation document in a picture format or a PDF format, illustratively, an optical character recognition (OCR) technology may be used to extract effective text contents in the regulation document. For a regulation document in a PPT format or a Word format, illustratively, a Microsoft Office software tool may be used to convert the regulation document into text contents, to acquire effective text contents in the regulation document, which may be specifically set according to actual needs. Here, the embodiments of the present disclosure are only described by taking the documents in these formats as examples, but it does not mean that the embodiments of the present disclosure are merely limited thereto. Illustratively, after the respective text contents corresponding to the plurality of regulations are acquired, the text contents may also be stored in a txt format uniformly, so as to facilitate reading and writing of a computer program.

Illustratively, when the keywords in the respective text contents corresponding to the plurality of objects are extracted, the keywords in the respective text contents corresponding to the plurality of objects may be extracted by using an existing keyword extraction algorithm; and the keywords in the respective text contents corresponding to the plurality of objects may also be extracted by using a keyword extraction model obtained through training based on deep learning, which may be specifically set according to actual needs. A method for extracting the keywords is not specifically limited in the embodiments of the present disclosure.

After the keywords corresponding to respective objects are obtained through extracting the keywords in the respective text contents corresponding to the plurality of objects, considering that the keywords can better express the text contents corresponding to the objects to some extent, a similarity between the plurality of objects can be determined according to the keywords corresponding to the objects, that is, the following S102 is executed.

S102: Determine a similarity between the plurality of objects according to the key words corresponding to the objects.

Generally, the similarity between two objects and a closeness degree of a relationship between the two objects are in a positive correlation relationship. That is, the larger the similarity between the two objects is, the higher the closeness degree of the relationship between the two objects is. Conversely, the smaller the similarity between the two objects is, the lower the closeness degree of the relationship between the two objects is.

After the similarity between the plurality of objects is determined, an object relationship network between the plurality of objects may be constructed according to the similarity between the plurality of objects, that is, the following S103 is executed.

S103: Construct an object relationship network between the plurality of objects according to the similarity between the plurality of objects.

It can be seen that, in the embodiment of the present disclosure, through extracting the keywords in the respective text contents corresponding to the plurality of objects, the keywords corresponding to respective objects are obtained; according to the keywords corresponding to the objects, the similarity between the plurality of objects is determined; and then according to the similarity between the plurality of objects, the object relationship network between the plurality of objects is constructed. In view that the object relationship network constructed by means of the similarity between the plurality of objects can accurately describe the closeness degree of the relationship between the objects, thus, the plurality of objects can be managed effectively by means of the constructed object relationship network.

With reference to the embodiment shown in FIG. 1, when the objects are regulations in the enterprise, a regulation relationship network between the regulations in the enterprise may be constructed by using the technical solution shown in FIG. 1. In view that the regulation relationship network constructed by means of the similarity between the plurality of regulations can accurately describe a closeness degree of a relationship between the regulations, therefore, the plurality of objects can be effectively managed by means of the constructed regulation relationship network. Compared with the prior art where the regulations are managed manually, labor cost is reduced, and the closeness degree of the relationship between the regulations can be intelligently described. This can not only provide an automation management tool for a manager of the enterprise, but also provide scientific data support for the management of the enterprise.

Figure 2:
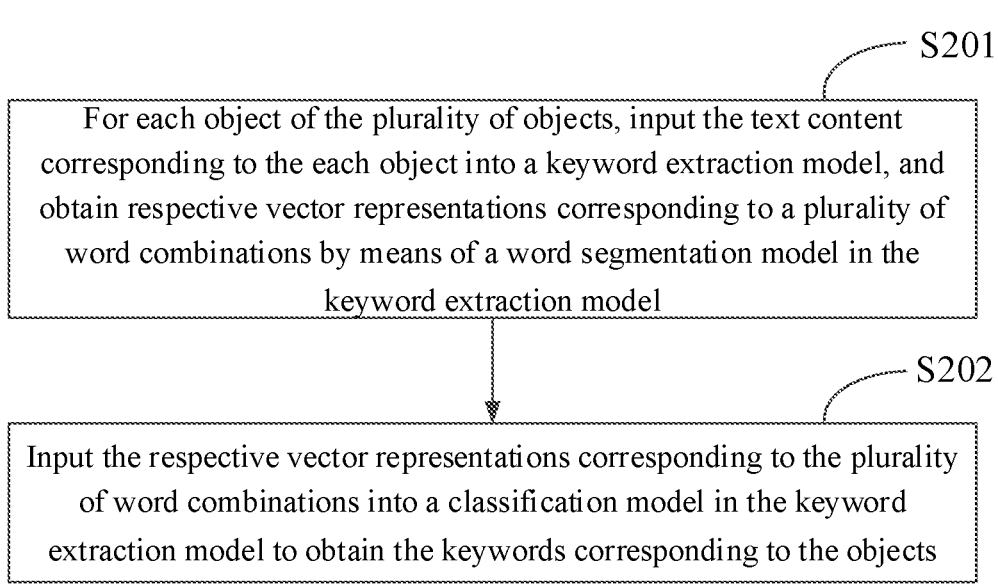
FIG. 2 is a schematic flowchart of a method for extracting keywords corresponding to respective objects according to a second embodiment of the present disclosure.

Based on the embodiment shown in FIG. 1, in order to facilitate understanding of how to extract the keywords in the respective text contents corresponding to the plurality of objects in S101, a second embodiment shown in FIG. 2 is described in detail in the following.

Second Embodiment

FIG. 2 is a schematic flowchart of a method for extracting keywords corresponding to respective objects according to a second embodiment of the present disclosure. The method may also be executed by software and/or a hardware apparatus. Illustratively, with reference to FIG. 2, the method for extracting the keywords corresponding to respective objects may include the following.

S201: For each object of the plurality of objects, input a text content corresponding to the each object into a keyword extraction model, and obtain respective vector representations corresponding to a plurality of word combinations by means of a word segmentation model in the keyword extraction model.

Illustratively, when the respective vector representations corresponding to the plurality of word combinations are acquired by means of the word segmentation model in the keyword extraction model, the plurality of word segmentations in the text content may be extracted first by means of the word segmentation model; vector representations corresponding to the word segmentations can be determined according to word embedding vectors and part-of-speech vectors corresponding to the word segmentations; and then the respective vector representations corresponding to the plurality of word combinations are determined according to the vector representations corresponding to the word segmentations, where the plurality of word combinations are formed by a plurality of adjacent word segmentations.

Illustratively, when the plurality of word segmentations in the text content are extracted by means of the word segmentation model in the keyword extraction model, word segmentation processing may be performed on the text content by means of the word segmentation model, to obtain the plurality of word segmentations and the part of speech of each word segmentation; further, the word embedding vectors corresponding to the word segmentations are determined; and when the part-of-speech vectors corresponding to the word segmentations are determined, the part-of-speech vectors corresponding to the word segmentations can be determined according to the parts of speech of the word segmentations, thereby acquiring the word embedding vectors and the part-of-speech vectors corresponding to the word segmentations. Illustratively, the part of speech may be a verb, a noun, a preposition, or an adjective, etc., which may be specifically set according to actual needs.

Still taking the example where the objects are regulations in an enterprise, illustratively, in the embodiment of the present disclosure, assuming that there are D regulations in total, and each regulation corresponds to a respective regulation document, i.e., there are a total of D regulation documents. When the vector representations corresponding to the word segmentations are determined, a Chinese word segmentation algorithm in the word segmentation model, for example jieba word segmentation, may be used to perform the word segmentation processing on a text content corresponding to an i-th regulation document of the D regulation documents, which may be recorded as $d^{(i)}$, so that a word segmentation list corresponding to a plurality of word segmentations and the part of speech of each word segmentation can be obtained, where a word segmentation list may be recorded as $w^{(i)}$, and the parts of speech of the word segmentations may be recorded as $p^{(i)}$.

After the word segmentation list $w^{(i)}$ corresponding to the i-th regulation document is acquired, a word embedding vector $e_j^{(i)}$ corresponding to each of the word segmentations may be learned by using a word2vec technology in the word segmentation model; where the word embedding vector is used for representing semantic information of each word segmentation, and j represents a j-th word segmentation in the word segmentation list $w^{(i)}$ corresponding to the i-th regulation document. In addition, a dictionary of part of speech in the word segmentation model may be used to perform one-hot encoding on the part of speech of each word segmentation, so as to generate a part-of-speech vector $p_j^{(i)}$, where the part-of-speech vector is used to represent part-of-speech information of each word segmentation in the contexts, thereby acquiring word embedding vectors and part-of-speech vectors corresponding to the word segmentations.

After the word embedding vectors and the part-of-speech vectors corresponding to the word segmentations are acquired, the vector representations corresponding to the word segmentations may be determined according to the word embedding vectors and the part-of-speech vectors corresponding to the word segmentations. Illustratively, in conjunction with the above description, taking a word segmentation being the j-th word segmentation in the word segmentation list $w^{(i)}$ corresponding to the i-th regulation document as an example, when a vector representation corresponding to the word segmentation is determined according to the word embedding vector $e_j^{(i)}$ and the part-of-speech vector $p_j^{(i)}$ corresponding to the word segmentation, a connecting operation may be performed on the word embedding vector $e_j^{(i)}$ and the part-of-speech vector $p_j^{(i)}$, and reference may be made to the following formula 1:

$$x_j^{(i)} = \text{concatenate}(e_j^{(i)}, p_j^{(i)})) \quad \text{Formula 1}$$

where $x_j^{(i)}$ represents a vector representation corresponding to the j-th word segmentation corresponding to the i-th regulation document, and for a matrix corresponding to the i-th regulation document, reference may be made to the following formula 2:

$$X^{(i)} = [x_1^{(i)}, x_2^{(i)}, \ldots, x_{N_i}^{(i)}] \quad \text{Formula 2}$$

where $X^{(i)}$ represents a matrix corresponding to the i-th regulation document, and $N_i$ represents the quantity of word segmentations corresponding to the i-th regulation document.

After the vector representations corresponding to respective word segmentations are acquired, considering that the granularity of word segmentation is relatively fine under normal circumstances, an N-gram combination operation may be performed on the word segmentations in sequence. Assuming that a preset sliding window value N=2, 3, . . . , k, then k adjacent words in the word segmentations may be combined into a new word, that is, a word combination. The word combination is a sequence of a plurality of adjacent word segmentations, thus a plurality of word combinations are obtained, and vector representations corresponding to the plurality of word combinations may be determined according to the word segmentations included in the word combinations.

Illustratively, if a certain regulation document corresponds to six word segmentations and the preset sliding window value N is 2, then five word combinations may be obtained through the N-gram combination. The five word combinations respectively include: a word combination formed by word segmentation 1 and word segmentation 2, a word combination formed by word segmentation 2 and word segmentation 3, a word combination formed by word segmentation 3 and word segmentation 4, a word combination formed by word segmentation 4 and word segmentation 5, and a word combination formed by word segmentation 5 and word segmentation 6.

After the respective vector representations corresponding to the plurality of word combinations are obtained through the foregoing operations, the respective vector representations corresponding to the plurality of word combinations may be input into a classification model in the keyword extraction model, to screen the plurality of word combinations to obtain a keyword, that is, S202 is executed. It can be understood that the keywords are also word combinations.

S202: Input the respective vector representations corresponding to the plurality of word combinations into a classification model in the keyword extraction model to obtain the keywords corresponding to the objects.

It can be seen that, in the embodiment of the present disclosure, when the keywords corresponding to respective objects are extracted, the text contents corresponding to the objects may be input into the keyword extraction model first, and the respective vector representations corresponding to the plurality of word combinations are obtained by means of the word segmentation model in the keyword extraction model; and then, the respective vector representations corresponding to the plurality of word combinations are input into the classification model in the keyword extraction model to obtain the keywords corresponding to the objects. In this way, the keywords corresponding to the objects can be accurately extracted by means of the keyword extraction model, thereby improving the accuracy of the acquired keywords.

Based on any one of the foregoing embodiments, in the above S102, when the similarity between the plurality of objects is determined according to the keywords corresponding to the plurality of objects, generally, for any two objects among the plurality of objects, the similarity may be determined. In the following description, take an example where any two objects among the plurality of objects may be recorded as a first object and a second object and where the similarity between the first object and the second object is determined according to respective keywords of the first object and the second object, to describe how to determine the similarity between the plurality of objects according to the keywords corresponding to the plurality of objects, and reference may be made to a third embodiment in the following.

Third Embodiment

Figure 3:
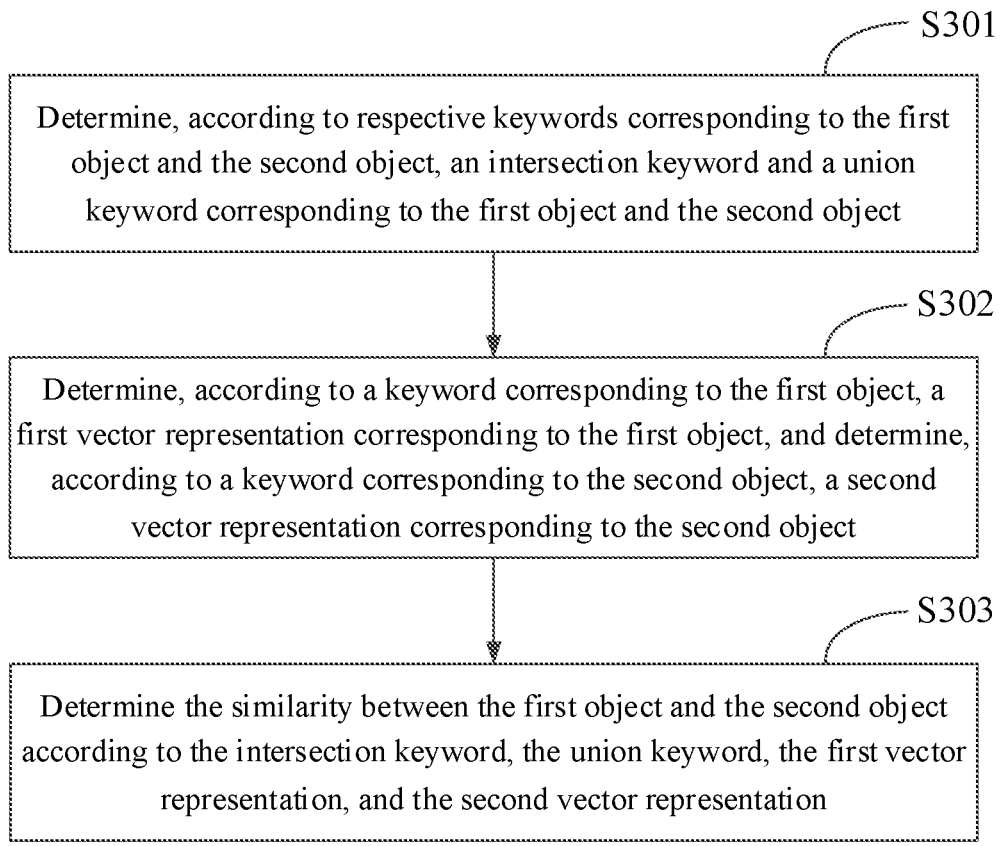
FIG. 3 is a schematic flowchart of a method for determining a similarity between a first object and a second object according to a third embodiment of the present disclosure.

FIG. 3 is a schematic flowchart of a method for determining a similarity between a first object and a second object according to a third embodiment of the present disclosure. The method may also be executed by software and/or a hardware apparatus. Illustratively, with reference to FIG. 3, the method may include the following.

S301: Determine, according to respective keywords corresponding to the first object and the second object, an intersection keyword and a union keyword corresponding to the first object and the second object.

Illustratively, assuming that the keywords corresponding to the first object include: keyword a, keyword b, keyword c, keyword d, and keyword e; and the keywords corresponding to the second object include: keyword a, keyword b, keyword c, keyword f, and keyword g; then the intersection keywords corresponding to the first object and the second object include the keyword a, the keyword b, and the keyword c, and the corresponding union keywords include the keyword a, the keyword b, the keyword c, the keyword d, the keyword e, a the keyword f, and the keyword g.

S302: Determine, according to a keyword corresponding to the first object, a first vector representation corresponding to the first object, and determine, according to a keyword corresponding to the second object, a second vector representation corresponding to the second object.

Illustratively, in the embodiment of the present disclosure, when the first vector representation corresponding to the first object is determined according to the keywords corresponding to the first object, word embedding vectors of respective keywords corresponding to the first object may be learned by using a word2vec technology; and the word embedding vectors of respective keywords are averaged to obtain the first vector representation corresponding to the first object. Similarly, when the second vector representation corresponding to the second object is determined according to the keywords corresponding to the second object, word embedding vectors of respective keywords corresponding to the second object may also be learned by using the word2vec technology; and the word embedding vectors of respective keywords are averaged to obtain the second vector representation corresponding to the second object.

It should be understood that, in the embodiment of the present disclosure, there is no sequence between S301 and S302. Step S301 may be executed first, and then step S302 is executed; or, step S302 may be executed first and then the step S301 is executed; or, step S301 and step S302 may be executed at the same time, which may be specifically set according to actual needs. Here, the embodiment of the present disclosure is only described by taking the step S301 being executed first and then the step S302 being executed as an example, but it does not mean that the embodiment of the present disclosure is merely limited thereto.

S303: Determine the similarity between the first object and the second object according to the intersection keyword, the union keyword, the first vector representation, and the second vector representation.

Illustratively, when the similarity between the first object and the second object is determined according to the intersection keywords, the union keywords, the first vector representation and the second vector representation, a first similarity, such as a jaccard similarity, between the first object and the second object may be determined according to a ratio of the quantity of the intersection keywords to the quantity of the union keywords; according to the first vector representation and the second vector representation, a second similarity between the first object and the second object is determined, such as a cosine similarity, an Euclidean distance similarity; and then, the similarity between the first object and the second object is determined according to the first similarity and the second similarity.

Illustratively, when the similarity between the first object and the second object is determined according to the first similarity and the second similarity, an average value of the first similarity and the second similarity may be directly determined, and the average value is determined as the similarity between the first object and the second object; or, a weighted average may also be performed on the first similarity and the second similarity, where the weights are different, and a weighted average result is determined as the similarity between the first object and the second object, thereby acquiring the similarity between the first object and the second object.

It can be seen that, in the embodiment of the present disclosure, when the similarity between the first object and the second object is determined, the intersection keyword and the union keyword corresponding to the first object and the second object may be determined according to respective keywords corresponding to the first object and the second object; the first vector representation corresponding to the first object is determined according to the keyword corresponding to the first object, and the second vector representation corresponding to the second object is determined according to the keyword corresponding to the second object; and then, the similarity between the first object and the second object is determined according to the intersection keyword, the union keyword, the first vector representation, and the second vector representation jointly, thereby effectively improving the accuracy of the determined similarity.

Figure 4:
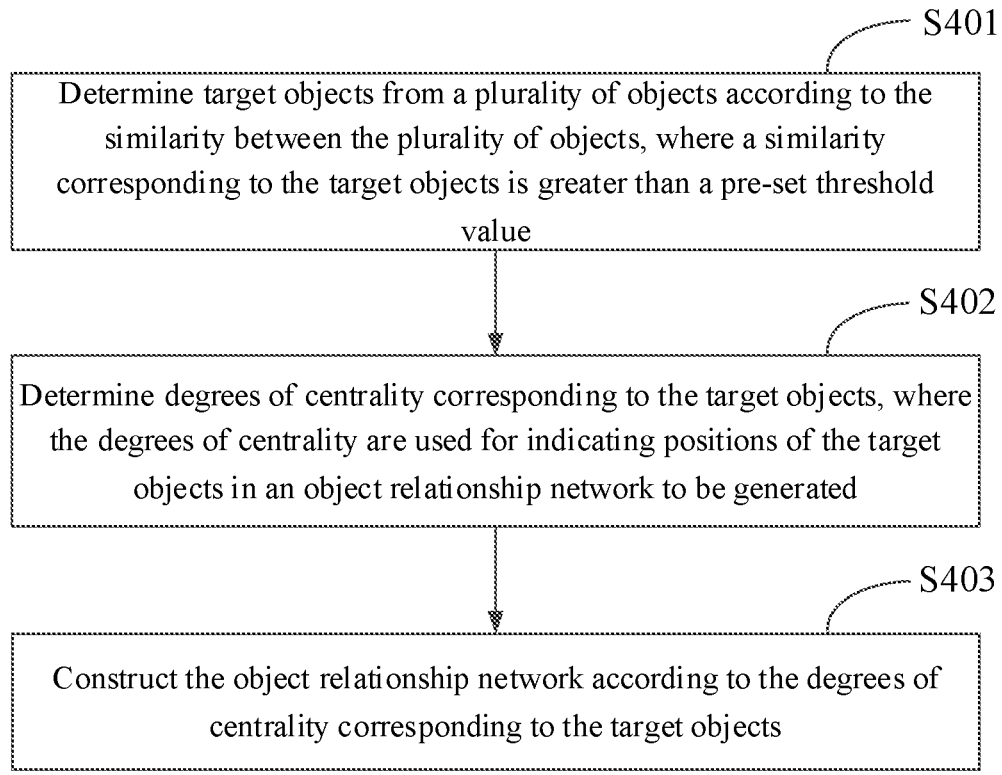
FIG. 4 is a schematic flowchart of a method for constructing an object relationship network between a plurality of objects according to a fourth embodiment of the present disclosure.

Based on any one of the foregoing embodiments, for ease of understanding, how to construct an object relationship network between the plurality of objects according to the similarity between the plurality of objects in S103 is described in detail in a fourth embodiment shown in FIG. 4.

Fourth Embodiment

FIG. 4 is a schematic flowchart of a method for constructing an object relationship network between a plurality of objects according to a fourth embodiment of the present disclosure, and the method may also be executed by software and/or a hardware apparatus. Illustratively, with reference to FIG. 4, the method may include the following.

S401: Determine target objects from a plurality of objects according to the similarity between the plurality of objects, where a similarity corresponding to the target objects is greater than a pre-set threshold value.

The value of the preset threshold may be set according to actual needs, and here, the value of the preset threshold is not specifically limited in the embodiment of the present disclosure.

Considering that if a similarity value between two objects is small, it is indicated that a closeness degree of a relationship between the two objects is low, and for objects with a relatively low closeness degree of relationship, there is no need to construct a relationship. Therefore, after the similarity between the plurality of objects is determined, a target object with a similarity greater than the pre-set threshold value may be further selected from the plurality of objects according to the similarity values, In this way, subsequently, an object relationship network including only the target objects may be constructed without considering objects with a relatively low closeness degree of relationship, and thus, the object relationship network is simplified effectively.

After target objects with a high closeness degree of relationship is determined from the plurality of objects, degrees of centrality corresponding to the target objects may be further determined, and the following S402 is executed.

S402: Determine degrees of centrality corresponding to the target objects, where the degrees of centrality are used for indicating positions of the target objects in an object relationship network to be generated.

Illustratively, a social network algorithm may be used to determine the degrees of centrality corresponding to the target objects, and other similar algorithms may also be used to determine the degrees of centrality corresponding to the target objects, which may be specifically set according to actual needs.

S403: Construct the object relationship network according to the degrees of centrality corresponding to the target objects.

Illustratively, when the object relationship network is constructed according to the degrees of centrality corresponding to the target objects, in a possible implementation, the object relationship network may be constructed only according to the degrees of centrality corresponding to the target objects. In the constructed object relationship network, target objects with relatively close positions have a relatively high closeness degree of relationship. If a certain target object is adjusted, for example, an object is changed, a linkage change may be caused to a target object at a relatively close position, and a target object at a relatively far position may not be caused to change. In this way, the plurality of objects can be effectively managed based on the object relationship network.

Figure 5:
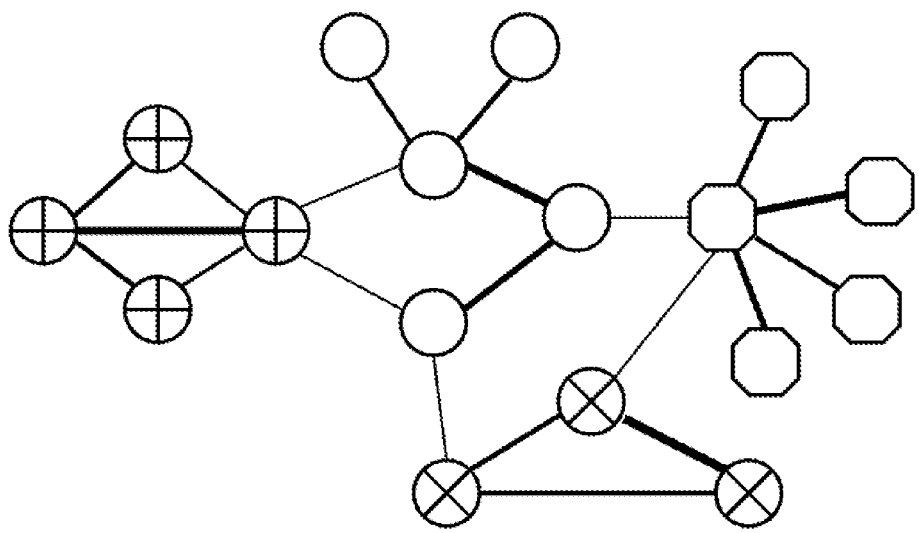
FIG. 5 is a schematic diagram of an object relationship network according to an embodiment of the present disclosure.

In another possible implementation, the target objects may be clustered first to obtain a plurality of clustering results; where the target objects in different clustering results have different node identifiers in the object relationship network to be generated; and the object relationship network is constructed according to the degrees of centrality and the node identifiers corresponding to the target objects. Illustratively, a node identifier may be a color of a node, a filling content of the node, and the like, as long as the target objects in different clustering results can be distinguished. Illustratively, with reference to FIG. 5, which is a schematic diagram of an object relationship network according to an embodiment of the present disclosure, the target objects represented by nodes with the same filling content in FIG. 5 have a high closeness degree of relationship between them. If a certain target object is adjusted, for example, if an object is changed, a linkage change may be caused to a target object in the same clustering result. In this way, the plurality of objects can be effectively managed based on the object relationship network.

It can be seen that, in the embodiment of the present disclosure, when the object relationship network is constructed, the target objects may be determined from the plurality of objects firstly according to the similarity between the plurality of objects; the degrees of centrality corresponding to the target objects are determined; and then the object relationship network is constructed according to the degrees of centrality corresponding to the target objects. In this way, if a certain target object is adjusted, a target object on which the linkage adjustment occurs may be determined visually according to the object relationship network, thereby implementing effective management of the plurality of objects.

Based on any one of the foregoing embodiments, before the keywords corresponding to the objects are acquired by means of the keyword extraction model, it is needed to obtain the keyword extraction model through training. Illustratively, when the keyword extraction model is being trained, although the keyword extraction model includes a word segmentation model and a classification model, however, in an embodiment of the present disclosure, only the classification model may be trained, so that after the classification model is obtained by training, the trained keyword extraction model may be obtained according to an existing word segmentation model and the classification model obtained by training. Hereinafter, how to train and obtain a classification model in the embodiment of the present disclosure will be described in detail in a fifth embodiment shown in FIG. 6.

Fifth Embodiment

Figure 6:
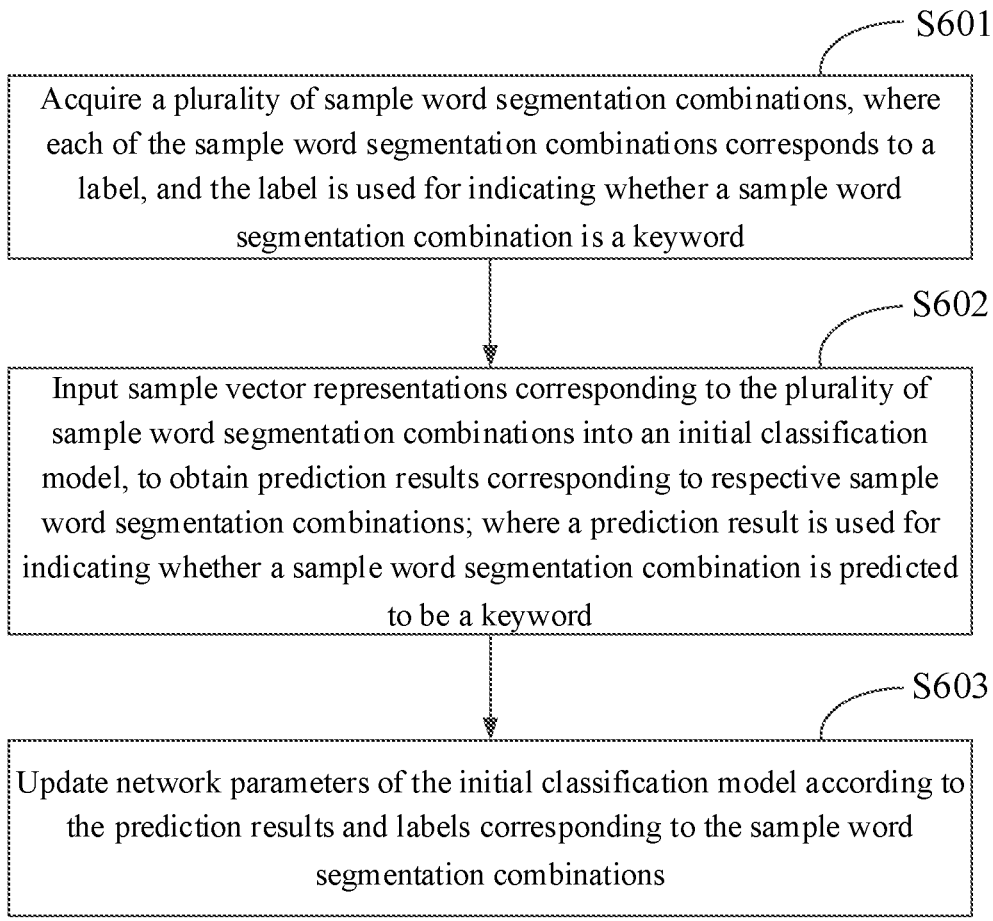
FIG. 6 is a schematic flowchart of a method for training a classification model according to a fifth embodiment of the present disclosure.

FIG. 6 is a schematic flowchart of a method for training a classification model according to a fifth embodiment of the present disclosure, and the method may also be executed by software and/or a hardware apparatus. Illustratively, with reference to FIG. 6, the method for training the classification model may include the following.

S601: Acquire a plurality of sample word segmentation combinations, where each of the sample word segmentation combinations corresponds to a label, and the label is used for indicating whether a sample word segmentation combination is a keyword.

Illustratively, when the plurality of sample word segmentation combinations are acquired, in a possible implementation, the plurality of sample word segmentation combinations may be a plurality of sample word segmentation combinations which are all manually labeled, for example, a plurality of sample word segmentation combinations which are adopted in a first iteration process.

In another possible implementation, considering that it is relatively difficult to obtain the plurality of sample word segmentation combinations which are all manually labeled, thus, in the plurality of sample word segmentation combinations, some of the sample word segmentation combinations are the plurality of sample word segmentation combinations which are manually labeled, and some of the sample word segmentation combinations are new sample word segmentation combinations which are obtained based on classification results of the plurality of sample word segmentation combinations. For example, the plurality of sample word segmentation combinations which are manually labeled are taken as initial training samples, and classification results of the sample combined word segmentations are obtained by means of the initial classification model. If the classification results indicate that some sample word segmentation combinations are keywords, the sample word segmentation combinations corresponding to these keywords can be used as new sample word segmentation combinations after manual checking. The plurality of sample word segmentation combinations which are manually labeled and the new sample word segmentation combinations are taken as the plurality of sample word segmentation combinations, for example, the plurality of sample word segmentation combinations used in a plurality of iteration processes.

After the plurality of sample word segmentation combinations are acquired, the following S602 may be executed.

S602: Input sample vector representations corresponding to the plurality of sample word segmentation combinations into an initial classification model, to obtain prediction results corresponding to respective sample word segmentation combinations; where a prediction result is used for indicating whether a sample word segmentation combination is predicted to be a keyword.

Illustratively, in an embodiment of the present disclosure, when the sample vector representations corresponding to the plurality of sample word segmentation combinations are acquired, the sample vector representations corresponding to the sample word segmentation combinations may be acquired by means of the word segmentation model. A specific implementation method thereof is similar to the method for acquiring the vector representations corresponding to the word combinations in S201, and reference may be made to the related description of acquiring respective vector representations corresponding to the word combinations in S201, which is not repeated in the embodiment of the present disclosure here.

After the sample vector representations corresponding to the plurality of sample word segmentation combinations are input into the initial classification model to obtain the prediction results corresponding to respective sample word segmentation combinations, network parameters of the initial classification model can be updated according to the prediction results and labels corresponding to the sample word segmentation combinations, i.e., the following S603 is executed.

S603: Update network parameters of the initial classification model according to the prediction results and labels corresponding to the sample word segmentation combinations.

Illustratively, when the network parameters of the initial classification model are updated according to the prediction results and the labels corresponding to the sample word segmentation combinations, if an updated classification model converges, the updated classification model is directly determined as a final classification model; and if the updated classification model does not converge, the above steps S601 to S603 are repeated to update the network parameters of the classification model until the updated classification model converges, and the converged classification model is determined as the final classification model, so as to obtain the classification model through training.

It can be seen that, in the embodiments of the present disclosure, when the classification model is trained, the plurality of sample word segmentation combinations can be obtained first; and the sample vector representations corresponding to the plurality of sample word segmentation combinations are input into the initial classification model to obtain the prediction results corresponding to respective sample word segmentation combinations; and then, the network parameters of the initial classification model are updated according to the prediction results and the labels corresponding to the sample word segmentation combinations, so that a classification model with higher accuracy can be acquired, thereby improving the accuracy of the acquired classification model.

Figure 7:
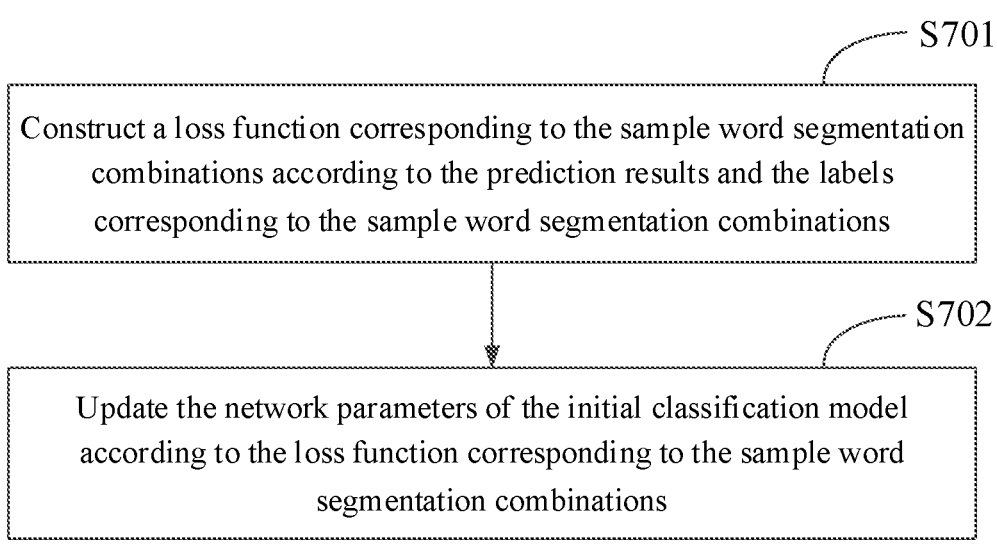
FIG. 7 is a schematic flowchart of a method for updating network parameters of an initial classification model according to a sixth embodiment of the present disclosure.

Based on the embodiment shown in FIG. 6, for ease of understanding, how to update the network parameters of the initial classification model according to the prediction results and the labels corresponding to the sample word segmentation combinations in S603 is described in detail in a sixth embodiment shown in FIG. 7.

Sixth Embodiment

FIG. 7 is a schematic flowchart of a method for updating network parameters of an initial classification model according to a sixth embodiment of the present disclosure, and the method may also be executed by software and/or a hardware apparatus. Illustratively, with reference to FIG. 7, the method may include the following.

S701: Construct a loss function corresponding to the sample word segmentation combinations according to the prediction results and the labels corresponding to the sample word segmentation combinations.

Illustratively, the loss function may be a cross entropy loss function, and may also be other loss functions, which may be specifically set according to actual needs.

S702: Update the network parameters of the initial classification model according to the loss function corresponding to the sample word segmentation combinations.

Illustratively, when the network parameters of the initial classification model are updated according to a loss function of the sample word segmentation combinations, since the plurality of sample word segmentation combinations are training samples used for performing a training operation, an average loss function corresponding to the plurality of sample word segmentation combinations can be determined according to loss functions corresponding to respective sample word segmentation combinations, and the network parameters of the initial classification model can be updated according to the average loss function.

It can be seen that, in the embodiment of the present disclosure, when the classification model is trained, the loss function corresponding to the sample word segmentation combinations may be constructed according to the prediction results and the labels corresponding to the sample word segmentation combinations; and the network parameters of the initial classification model are updated according to the loss functions corresponding to the sample word segmentation combinations, so that a classification model with high accuracy can be acquired, thereby improving the accuracy of the acquired classification model.

Seventh Embodiment

Figure 8:
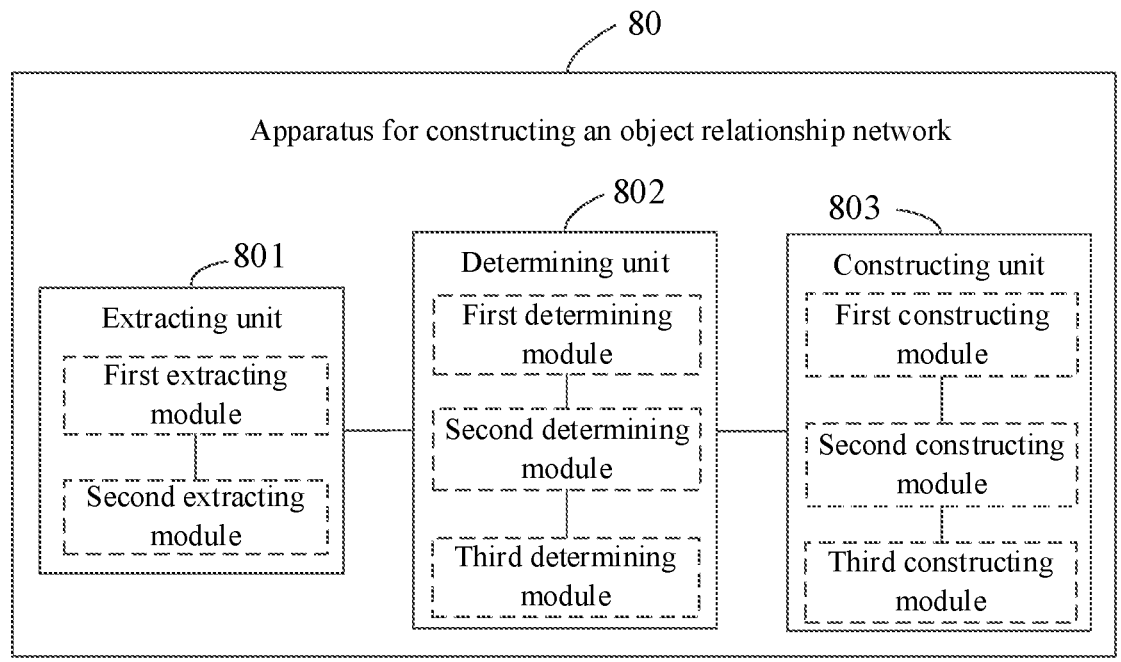
FIG. 8 is a schematic structural diagram of an apparatus for constructing an object relationship network according to a seventh embodiment of the present disclosure.

FIG. 8 is a schematic structural diagram of an apparatus 80 for constructing an object relationship network according to a seventh embodiment of the present disclosure. For example, with reference to FIG. 8, the apparatus 80 for constructing the object relationship network may include:

an extracting unit 801, configured to extract keywords in respective text contents corresponding to a plurality of objects to obtain keywords corresponding to respective objects;

a determining unit 802, configured to determine a similarity between the plurality of objects according to the keywords corresponding to the objects; and a constructing unit 803, configured to construct an object relationship network between the plurality of objects according to the similarity between the plurality of objects.

In an embodiment, the extracting unit 801 includes a first extracting module and a second extracting module, the first extracting module is configured to input the text contents corresponding to the objects into a keyword extraction model, and obtain respective vector representations corresponding to a plurality of word combinations by means of a word segmentation model in the keyword extraction model; and the second extracting module is configured to input the respective vector representations corresponding to the plurality of word combinations into a classification model in the keyword word extraction model to obtain the keywords corresponding to the objects.

In an embodiment, the first extracting module includes a first extracting sub-module, a second extracting sub-module and a third extracting sub-module, the first extracting sub-module is configured to extract a plurality of word segmentations in the text contents by means of the word segmentation model;

the second extracting sub-module is configured to determine, according to word embedding vectors and part-ofspeech vectors corresponding to the word segmentations, vector representations corresponding to the word segmentations; and the third extracting sub-module is configured to determine, according to the vector representations corresponding to the word segmentations, the respective vector representations corresponding to the plurality of word combinations, where the plurality of word combinations are formed by a plurality of adjacent word segmentations.

In an embodiment, the plurality of objects include a first object and a second object, and the determining unit 802 includes a first determining module, a second determining module, and a third determining module;

the first determining module is configured to determine, according to respective keywords corresponding to the first object and the second object, an intersection keyword and a union keyword corresponding to the first object and the second object;

the second determining module is configured to determine, according to a keyword corresponding to the first object, a first vector representation corresponding to the first object, and determine, according to a keyword corresponding to the second object, a second vector representation corresponding to the second object; and the third determining module is configured to determine a similarity between the first object and the second object according to the intersection keyword, the union keyword, the first vector representation, and the second vector representation.

In an embodiment, the third determining module includes a first determining sub-module, a second determining sub-module and a third determining sub-module, the first determining sub-module is configured to determine a first similarity between the first object and the second object according to a ratio of the quantity of the intersection keyword to the quantity of the union keyword;

the second determining sub-module is configured to determine a second similarity between the first object and the second object according to the first vector representation and the second vector representation; and the third determining sub-module is configured to determine the similarity between the first object and the second object according to the first similarity and the second similarity.

In an embodiment, the constructing unit 803 includes a first constructing module, a second constructing module, and a third constructing module;

the first constructing module is configured to determine target objects from the plurality of objects according to the similarity between the plurality of objects; where a similarity corresponding to the target objects is greater than a pre-set threshold value;

the second constructing module is configured to determine degrees of centrality corresponding to the target objects, where the degrees of centrality are used for indicating positions of the target objects in an object relationship network to be generated; and the third constructing module is configured to construct the object relationship network according to the degrees of centrality corresponding to the target objects.

In an embodiment, the third constructing module includes a first constructing sub-module and a second constructing sub-module;

the first constructing sub-module is configured to cluster the target objects to obtain a plurality of clustering results; where the target objects in different clustering results have different node identifiers in the object relationship network to be generated; and the second constructing sub-module is configured to construct the object relationship network according to the degrees of centrality and the node identifiers corresponding to the target objects.

The apparatus 80 for constructing the object relationship network provided by the embodiments of the present disclosure can execute technical solutions of the method for constructing an object relationship network as shown in any one of the above embodiments. Implementation principles and beneficial effects thereof are similar to implementation principles and beneficial effects of the method for constructing the object relationship network. Reference can be made to the implementation principles and the beneficial effects of the method for constructing the object relationship network, and the details thereof are not described herein again.

Eighth Embodiment

Figure 9:
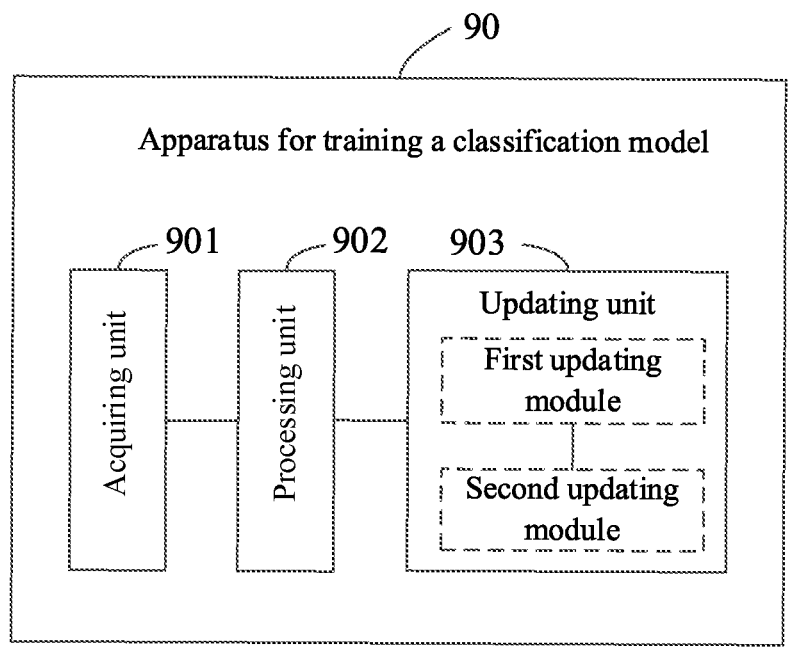
FIG. 9 is a schematic structural diagram of an apparatus for training a classification model according to an eighth embodiment of the present disclosure.

FIG. 9 is a schematic structural diagram of an apparatus 90 for training a classification model according to an eighth embodiment of the present disclosure. Illustratively, with reference to FIG. 9, the apparatus 90 for training the classification model may include:

an acquiring unit 901, configured to acquire a plurality of sample word segmentation combinations, where each of the sample word segmentation combinations corresponds to a label, and the label is used for indicating whether a sample word segmentation combination is a keyword;

a processing unit 902, configured to input sample vector representations corresponding to the plurality of sample word segmentation combinations into an initial classification model, to obtain prediction results corresponding to respective ones of the sample word segmentation combinations; where a prediction result is used for indicating whether a sample word segmentation combination is a keyword; and an updating unit 903, configured to update network parameters of the initial classification model according to the prediction results and labels corresponding to the sample word segmentation combinations.

In an embodiment, the updating unit 903 includes a first updating module and a second updating module;

the first updating module is configured to construct, according to the prediction results and the labels corresponding to the sample word segmentation combinations, a loss function corresponding to the sample word segmentation combinations; and the second updating module is configured to update the network parameters of the initial classification model according to the loss function corresponding to the sample word segmentation combinations.

The apparatus 90 for training the classification model provided by the embodiments of the present disclosure can execute technical solutions of the method for training a classification model as shown in any one of the above embodiments. Implementation principles and beneficial effects thereof are similar to implementation principles and beneficial effects of the method for training the classification model. Reference can be made to the implementation principles and the beneficial effects of the method for training the classification model, and the details thereof are not described herein again.

According to embodiments of the present disclosure, the present disclosure further provides an electronic device, a readable storage medium, and a computer program product.

According to an embodiment of the present disclosure, the present disclosure further provides a computer program product. The computer program product includes a computer program which is stored in a readable storage medium. At least one processor of an electronic device can read the computer program from the readable storage medium, and executes the computer program to cause the electronic device to execute the solution provided by any one of the above embodiments.

Figure 10:
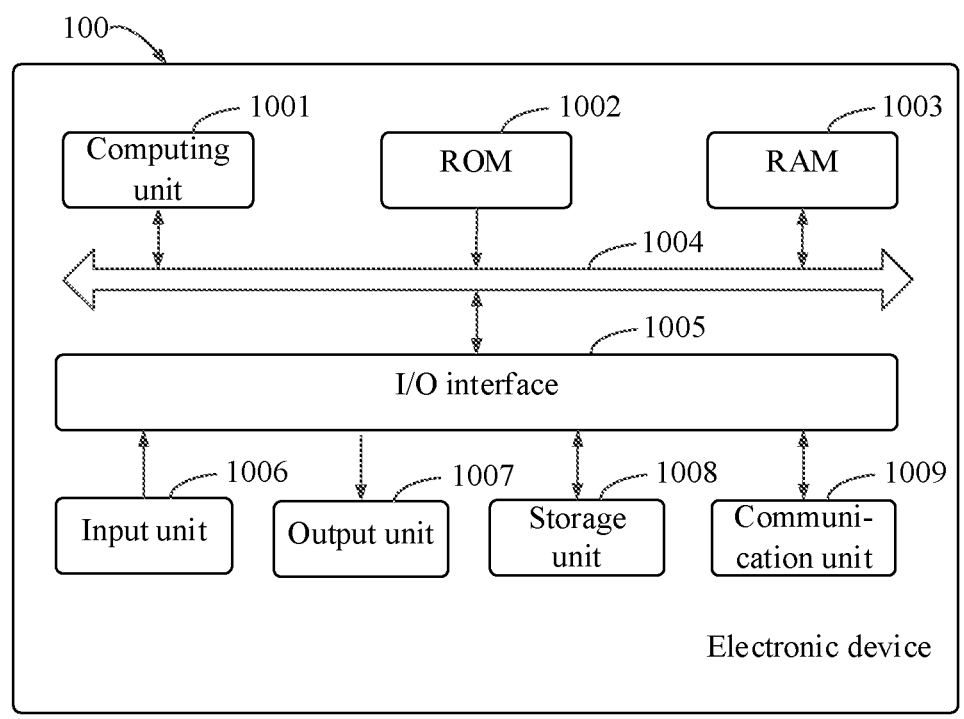
FIG. 10 is a schematic block diagram of an electronic device according to an embodiment of the present disclosure.

FIG. 10 is a schematic block diagram of an electronic device 100 according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent a variety of forms of mobile apparatuses, such as the personal digital assistant, a cellular telephone, a smart phone, a wearable device, and other similar computing apparatuses. The components shown herein, their connections and relationships, and their functions are only illustrative, which are not intended to limit implementations of the present disclosure described and/or claimed herein.

As shown in FIG. 10, the device 100 includes a computing unit 1001 which may perform various appropriate operations and processes according to a computer program stored in a read only memory (ROM) 1002 or a computer program loaded into a random access memory (RAM) 1003 from a storage unit 1008. In the RAM 1003, various programs and data which are necessary for operations of the storage device 100 are also stored. The computing unit 1001, the ROM 1002, and the RAM 1003 are connected to each other via a bus 1004. An input/output (I/O) interface 1005 is also connected to the bus 1004.

A plurality of components in the device 100 are connected to the I/O interface 1005, including: an input unit 1006, such as a keyboard, a mouse; an output unit 1007, such as various types of displays, speakers; a storage unit 1008, such as a magnetic disk, an optical disk; and a communication unit 1009, such as a network card, a modem, a wireless communication transceiver. The communication unit 1009 allows the device 100 to exchange information/data with other devices through a computer network such as the Internet and/or various telecommunication networks.

The computing unit 1001 may be a variety of general and/or special processing components with processing and computing capabilities. Some examples of the computing unit 1001 include, but are not limited to, a central processing unit (CPU), a graphics processing unit (GPU), a variety of specific artificial intelligence (AI) computing chips, a variety of computing units running machine learning model algorithms, a digital signal processor (DSP), and any suitable processor, controller, microcontroller, etc. The computing unit 1001 executes the various methods and processes described above, such as a method for constructing an object relationship network or a method for training a classification model. For example, in some embodiments, the method for constructing the object relationship network or the method for training the classification model may be implemented as a computer software program which is tangibly embodied in a machine-readable medium, such as the storage unit 1008. In some embodiments, some or all of the computer program may be loaded into and/or installed onto the device 100 via the ROM 1002 and/or the communications unit 1009. When the computer program is loaded into the RAM 1003 and executed by the computing unit 1001, one or more steps of the above method for constructing the object relationship network or the method for training the classification model may be executed. Alternatively, in other embodiments, the computing unit 1001 may be configured to execute the method for constructing the object relationship network or the method for training the classification model in any other suitable manner (e.g., by means of firmware).

Various implementation manners of the systems and techniques described above herein may be implemented in a digital electronic circuit system, an integrated circuit system, a field programmable gate array (FPGA), an application specific integrated circuit (ASIC), an application specific standard product (ASSP), a system-on-chip (SOC) system, a complex programmable logic device (CPLD), computer hardware, firmware, software, and/or a combination thereof. These various implementations may include an implementation implemented in one or more computer programs that are executable and/or interpretable in a programmable system including at least one programmable processor. The programmable processor may be a specific or a general programmable processor, and may receive data and instructions from a storage system, at least one input apparatus, and at least one output apparatus, and transmit data and instructions to the storage system, the at least one input apparatus, and at least one output apparatus.

Program codes for implementing the method of the present disclosure may be written in any combination of one or more programming languages. The program codes may be provided to a processor or a controller of a general computer, a specific computer, or other programmable data processing apparatuses, such that the program codes, when being executed by the processor or the controller, cause the functions/operations which are specified in flowcharts and/or block diagrams to be executed. The program codes may execute entirely by a machine, partially by a machine, partially by a machine as a stand-alone software package and partially by a remote machine, or entirely by a remote machine or server.

In the context of the present disclosure, a machine readable medium may be a tangible media that may contain or store a program for use by an instruction execution system, apparatus, or device or a program for use in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

To provide for interaction with a user, the systems and techniques described herein may be implemented on a computer having: a display apparatus (e.g., a CRT (cathode ray tube) or an LCD (liquid crystal display) monitor) for displaying information to the user; and a keyboard and a pointing apparatus (e.g., a mouse or a trackball) by which the user can provide an input to a computer. Other kinds of apparatuses may also be used to provide for interaction with the user. For example, feedback provided to the user may be any form of sensory feedback (e.g., visual feedback, auditory feedback, or tactile feedback); and may receive an input from the user in any form, including an acoustic input, a speech input, or a tactile input.

The systems and techniques described herein may be implemented in a computing system which includes a back-end component (e.g., as a data server), or a computing system which includes a middleware component (e.g., an application server), or a computing system which includes a front-end component (e.g., a user computer having a graphical user interface or a web browser, through which the user may interact with an implementation of the systems and techniques described herein), or a computing system which includes any combination of such back-end, middleware, or front-end components. The components of the systems may be interconnected by digital data communications (e.g., a communication network) in any form or medium. Examples of the communication network include a local area network (LAN), a wide area network (WAN), and the Internet.

The computing system may include a client and a server. The client and the server are generally remote from each other and typically interact through the communication network. The relationship between the client and the server arises by virtue of computer programs running on respective computers and having a client-server relationship therebetween. The server may be a cloud server, which is also referred to as a cloud computing server or a cloud host, and it is a host product in a cloud computing service system, so as to solve defects of difficult management and weak business scalability existing in a traditional physical host and a VPS (Virtual Private Server) service. The server may also be a server of a distributed system, or a server combined with a block chain.

It should be understood that the steps may be reordered, added, or deleted using the various forms of flow shown above. For example, the steps described in the present disclosure may be executed in parallel, may be executed sequentially, or may be executed in a different order, as long as desired results of the technical solutions disclosed in the present disclosure can be achieved, which is not limited herein.

The above specific implementations do not limit the protection scope of the present disclosure. It should be understood by a person skilled in the art that various modifications, combinations, sub-combinations and replacements can be made according to design requirements and other factors. Any modifications, equivalent replacements, improvements and the like made within the spirit and principle of the present disclosure shall all be included within the protection scope of the present disclosure.

What is claimed is:

1. A method for constructing an object relationship network, applied to an electronic device and comprising:
    extracting keywords in respective text contents corresponding to a plurality of objects to obtain keywords corresponding to respective objects;
    determining a similarity between the plurality of objects according to the keywords corresponding to the respective objects; and
    constructing the object relationship network between the plurality of objects according to the similarity between the plurality of objects;
    wherein the constructing the object relationship network between the plurality of objects according to the similarity between the plurality of objects comprises:
    determining target objects from the plurality of objects according to the similarity between the plurality of objects, wherein a similarity corresponding to the target objects is greater than a pre-set threshold value;
    determining degrees of centrality corresponding to the target objects, wherein the degrees of centrality are used for indicating positions of the target objects in the object relationship network to be generated; and
    constructing the object relationship network according to the degrees of centrality corresponding to the target objects;
    wherein the constructing the object relationship network according to the degrees of centrality corresponding to the target objects comprises:
    clustering the target objects to obtain a plurality of clustering results, wherein the target objects in different clustering results have different node identifiers in the object relationship network to be generated; and
    constructing the object relationship network according to the degrees of centrality and the node identifiers corresponding to the target objects.

2. The method according to claim 1, wherein the extracting the keywords in the respective text contents corresponding to the plurality of objects to obtain the keywords corresponding to the respective objects comprises:
    for each object of the plurality of objects, inputting a text content corresponding to the each object into a keyword extraction model, and obtaining respective vector representations corresponding to a plurality of word combinations by means of a word segmentation model in the keyword extraction model; and
    inputting the respective vector representations corresponding to the plurality of word combinations into a classification model in the keyword extraction model to obtain the keywords corresponding to the respective objects.

3. The method according to claim 2, wherein the obtaining the respective vector representations corresponding to the plurality of word combinations by means of the word segmentation model in the keyword extraction model comprises:
    extracting a plurality of word segmentations in the text content by means of the word segmentation model;
    determining, according to word embedding vectors and part-of-speech vectors corresponding to the word segmentations, vector representations corresponding to the word segmentations; and
    determining, according to the vector representations corresponding to the word segmentations, the respective vector representations corresponding to the plurality of word combinations, wherein the plurality of word combinations are formed by a plurality of adjacent word segmentations.

4. The method according to claim 3, wherein the plurality of objects comprise a first object and a second object, and determining a similarity between the first object and the second object according to the keywords corresponding to the respective objects comprises:
    determining, according to respective keywords corresponding to the first object and the second object, an intersection keyword and a union keyword corresponding to the first object and the second object;
    determining, according to a keyword corresponding to the first object, a first vector representation corresponding to the first object, and determining, according to a keyword corresponding to the second object, a second vector representation corresponding to the second object; and determining the similarity between the first object and the second object according to the intersection keyword, the union keyword, the first vector representation, and the second vector representation.

5. The method according to claim 2, wherein the plurality of objects comprise a first object and a second object, and determining a similarity between the first object and the second object according to the keywords corresponding to the respective objects comprises:

determining, according to respective keywords corresponding to the first object and the second object, an intersection keyword and a union keyword corresponding to the first object and the second object;

determining, according to a keyword corresponding to the first object, a first vector representation corresponding to the first object, and determining, according to a keyword corresponding to the second object, a second vector representation corresponding to the second object; and determining the similarity between the first object and the second object according to the intersection keyword, the union keyword, the first vector representation, and the second vector representation.

6. The method according to claim 5, wherein the determining the similarity between the first object and the second object according to the intersection keyword, the union keyword, the first vector representation, and the second vector representation comprises:

determining a first similarity between the first object and the second object according to a ratio of a quantity of the intersection keyword to a quantity of the union keyword;

determining a second similarity between the first object and the second object according to the first vector representation and the second vector representation; and determining the similarity between the first object and the second object according to the first similarity and the second similarity.

7. The method according to claim 1, wherein the plurality of objects comprise a first object and a second object, and determining a similarity between the first object and the second object according to the keywords corresponding to the respective objects comprises:

determining, according to respective keywords corresponding to the first object and the second object, an intersection keyword and a union keyword corresponding to the first object and the second object;

determining, according to a keyword corresponding to the first object, a first vector representation corresponding to the first object, and determining, according to a keyword corresponding to the second object, a second vector representation corresponding to the second object; and determining the similarity between the first object and the second object according to the intersection keyword, the union keyword, the first vector representation, and the second vector representation.

8. The method according to claim 7, wherein the determining the similarity between the first object and the second object according to the intersection keyword, the union keyword, the first vector representation, and the second vector representation comprises:

determining a first similarity between the first object and the second object according to a ratio of a quantity of the intersection keyword to a quantity of the union keyword;

determining a second similarity between the first object and the second object according to the first vector representation and the second vector representation; and determining the similarity between the first object and the second object according to the first similarity and the second similarity.

9. The method according to claim 1, wherein the keywords are obtained by using a keyword extraction model, the keyword extraction model comprises a word segmentation model and a classification model, and a method for training the classification model in the keyword extraction model comprises:

acquiring a plurality of sample word segmentation combinations, wherein each of the sample word segmentation combinations corresponds to a label, and the label is used for indicating whether a sample word segmentation combination is a keyword;

inputting sample vector representations corresponding to the plurality of sample word segmentation combinations into an initial classification model, to obtain prediction results corresponding to respective ones of the sample word segmentation combinations; wherein a prediction result is used for indicating whether a sample word segmentation combination is predicted to be a keyword; and updating network parameters of the initial classification model according to the prediction results and labels corresponding to the sample word segmentation combinations;

wherein the updating the network parameters of the initial classification model according to the prediction results and the labels corresponding to the sample word segmentation combinations comprises:

constructing a loss function corresponding to the sample word segmentation combinations according to the prediction results and the labels corresponding to the sample word segmentation combinations; and updating the network parameters of the initial classification model according to the loss function corresponding to the sample word segmentation combinations.

10. An apparatus for constructing an object relationship network, comprising:

at least one processor; and a memory communicatively coupled to the at least one processor, wherein the memory stores instructions which are executable by the at least one processor, the instructions are executed by the at least one processor, to enable the at least one processor to:

extract keywords in respective text contents corresponding to a plurality of objects to obtain keywords corresponding to respective objects;

determine a similarity between the plurality of objects according to the keywords corresponding to the objects; and construct the object relationship network between the plurality of objects according to the similarity between the plurality of objects;

wherein the at least one processor is configured to:

determine target objects from the plurality of objects according to the similarity between the plurality of objects, wherein a similarity corresponding to the target objects is greater than a pre-set threshold value;

determine degrees of centrality corresponding to the target objects, wherein the degrees of centrality are used for indicating positions of the target objects in the object relationship network to be generated; and construct the object relationship network according to the degrees of centrality corresponding to the target objects;

wherein the at least one processor is configured to:

cluster the target objects to obtain a plurality of clustering results, wherein the target objects in different clustering results have different node identifiers in the object relationship network to be generated; and construct the object relationship network according to the degrees of centrality and the node identifiers corresponding to the target objects.

11. A non-transitory computer-readable storage medium storing computer instructions, wherein the computer instructions are used for causing a computer to execute the method for constructing an object relationship network according to claim 1.

* * * * *